Oct. 8, 1940.                H. EDLER                2,217,435
                    DIRECT-CURRENT MEASURING DEVICE
                         Filed May 21, 1938
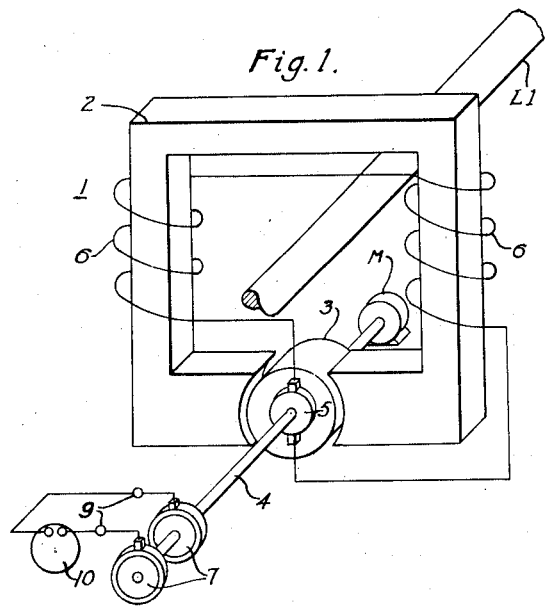
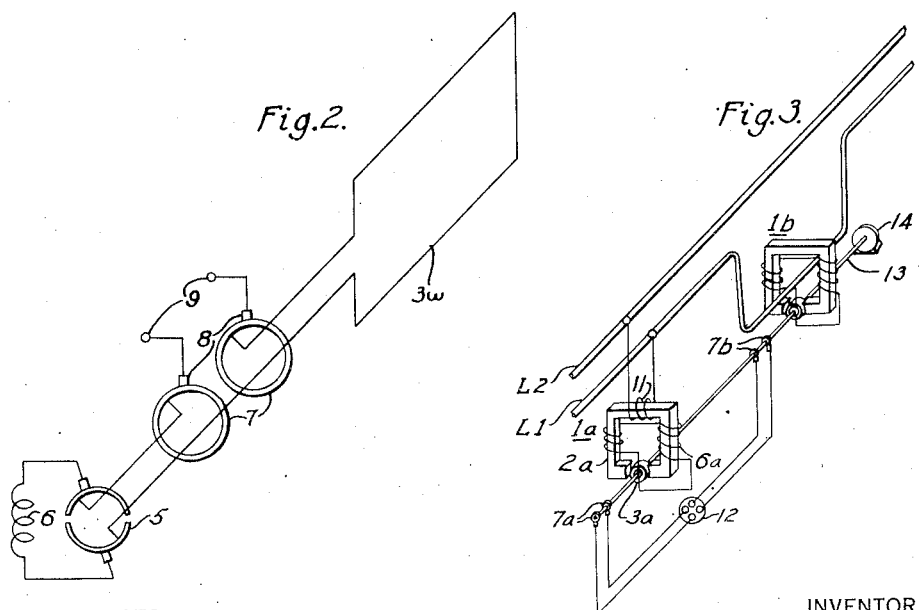
INVENTOR
Hans Edler.

Patented Oct. 8, 1940

2,217,435

UNITED STATES PATENT OFFICE 2,217,435

DIRECT-CURRENT MEASURING DEVICE

Hans Edler, Nuremberg, Germany, assignor to Westinghouse Electric & Manufacturing Company, East Pittsburgh, Pa., a corporation of Pennsylvania Application May 21, 1938, Serial No. 209,277
In Germany September 30, 1937

1 Claim. (Cl. 171—123)

This invention relates to devices controlled from a direct-current circuit, and it has particular relation to systems for controlling alternating-current responsive devices from a direct-current circuit.

Direct-current devices, such as measuring instruments, often are less accurate, rugged and reliable than corresponding alternating-current devices. Moreover, the alternating-current devices are safer and more flexible for the reason that they may be separated from their control circuits by insulating transformers.

According to my invention, instead of applying a direct-current quantity directly to a measuring instrument or other device, the direct-current quantity is employed merely for controlling the production of an alternating-current quantity which is applied to an alternating-current device. As a result, alternating-current instruments may be employed when desired in the direct-current field.

It is, therefore, an object of my invention to control an alternating-current quantity in accordance with a direct-current quantity.

Another object of my invention is to measure a direct-current quantity by means of an alternating-current instrument.

A still further object of my invention is to convert a variable direct-current quantity into a variable alternating-current quantity and apply the latter to an alternating-current responsive device.

Further objects of my invention will be apparent from the following description of my invention, taken in conjunction with the accompanying drawing, wherein:

Figure 1 is a schematic view in perspective of a direct-current measuring system embodying my invention;

Figure 2 is a diagrammatic view in perspective showing the circuit connections of the system illustrated in Fig. 1; and, Fig. 3 is a view in perspective of a power responsive system embodying my invention.

Referring to the drawing, Figure 1 discloses a conductor L1 carrying a direct current to be measured.

In order to develop an alternating current controlled by the direct current flowing in the conductor L1, a direct-current generator unit 1 is provided having an iron-core field member or stator 2, which may be positioned around the conductor L1. A gap is provided in the field member 2 within which is positioned an armature 3 mounted on a shaft 4. The armature 3 is rotated by means of a motor M which is coupled to the shaft 4.

Because the conductor L1 passes through the field member 2, the direct current flowing in the conductor produces in the field member 2 a magnetic flux which cuts the armature 3.

Direct current is supplied from a commutator 5 associated with the armature 3 to a counter-magnetizing winding 6. This counter-magnetizing winding 6 is so positioned with respect to the field member 2 that it opposes the flux produced in the field member by current flowing in the conductor L1.

Under operating conditions the armature current increases until, with a small residual value, the magneto-motive force of the magnetizing winding is equal to that of the current flowing in the conductor L1. When this equality obtains, the current in the armature 3 bears a predetermined relation to that in the conductor L1.

Since the structure so far described forms the basis of a known direct-current measuring device, a more detailed description is unnecessary.

In order to adapt the above structure for use with alternating-current instruments, a pair of slip rings 7 are mounted on the shaft 4. As shown more clearly in Fig. 2, the slip rings 7 are connected in series with segments of the commutator 5, the magnetizing winding 6 and the winding 3w of the armature 3. The slip rings 7 may be provided with brushes 8 connected to a pair of terminals 9.

Any alternating-current responsive device 10, which is to be controlled by the direct current flowing in the conductor L1, may be connected across the terminals 9. As a specific example, the device 10 may be an induction meter.

The operation of the embodiment shown in Figs. 1 and 2 now may be set forth. Because of the circuit connections illustrated, the same alternating current flowing through the meter or device 10 is rectified by the commutator 5 and passed through the magnetizing winding 6. Consequently, the alternating current flowing through the device 10 and the direct current supplied to the magnetizing winding 6 maintain a predetermined proportion with respect to the direct current flowing in the conductor L1, and the device 10 may be calibrated to indicate a value or values of the current in the conductor L1.

Direct-current quantities other than current may be employed for controlling alternating-current devices in accordance with the invention. For example, Fig. 3 illustrates an embodiment wherein the voltage of a direct-current circuit is employed for controlling an alternating current supplied to a meter.

Fig. 3 discloses a generator unit 1a including a field member 2a, an armature 3a, a countermagnetizing winding 6a and slip rings 7a which are similar to the corresponding elements of Fig. 1. In this case, however, a separate winding 11 is provided for forcing flux through the field member 2a. This winding 11 is connected across the conductors L1, L2 of a direct-current circuit. As a result, the alternating current supplied by the slip rings 7a is dependent on the voltage across the conductors L1, L2.

A generator unit 1b, which is similar to the unit 1 of Fig. 1, is also shown in Fig. 3 for supplying from a pair of slip rings 7b an alternating current dependent on the current flowing in the conductor L1. The outputs from the slip rings 7a, 7b may be employed for energizing any desired alternating-current apparatus. In Fig. 3, the outputs from the slip rings 7a, 7b are connected respectively to the voltage and current circuits of an alternating-current wattmeter 12 for measuring the power supplied by the direct-current circuit.

The armatures 3a, 3b of the generator units are driven in synchronism by any suitable driving means. As illustrated in Fig. 3, the armatures 3a, 3b and slip rings 7a, 7b are mounted on a common shaft 13 which is rotated by a motor 14.

If it is desired to insulate the instruments 10, 12 from the remainder of the apparatus, they may be coupled to the apparatus through insulating transformers. This practice is particularly advantageous for high voltage, direct-current systems.

Although for the purpose of illustration I have described my invention with reference to certain specific embodiments thereof, I fully realize that many modifications thereof are possible. Therefore, my invention is to be limited only by the following claim as interpreted in view of the prior art.

I claim as my invention:

In a system for converting a direct-current quantity into an alternating-current quantity, a magnetic member for establishing a path for magnetic flux generated in accordance with said direct-current quantity, an armature member in said path, said members being relatively rotatable, means for producing relative rotation between said members, a rectifier member for supplying direct current from said armature member, a plurality of conductor elements for supplying alternating current from said armature member, and a winding connected for direct current energization from said rectifier for opposing the flow of said magnetic flux, said armature member, rectifier, winding and conductor elements being connected in series.

HANS EDLER.